Oct. 30, 1923.
L. J. COLE ET AL
1,472,553
COMBINED CLEANER, RAIN DEFLECTOR, AND LIGHT GUARD FOR WINDSHIELDS
Filed Feb. 25, 1922
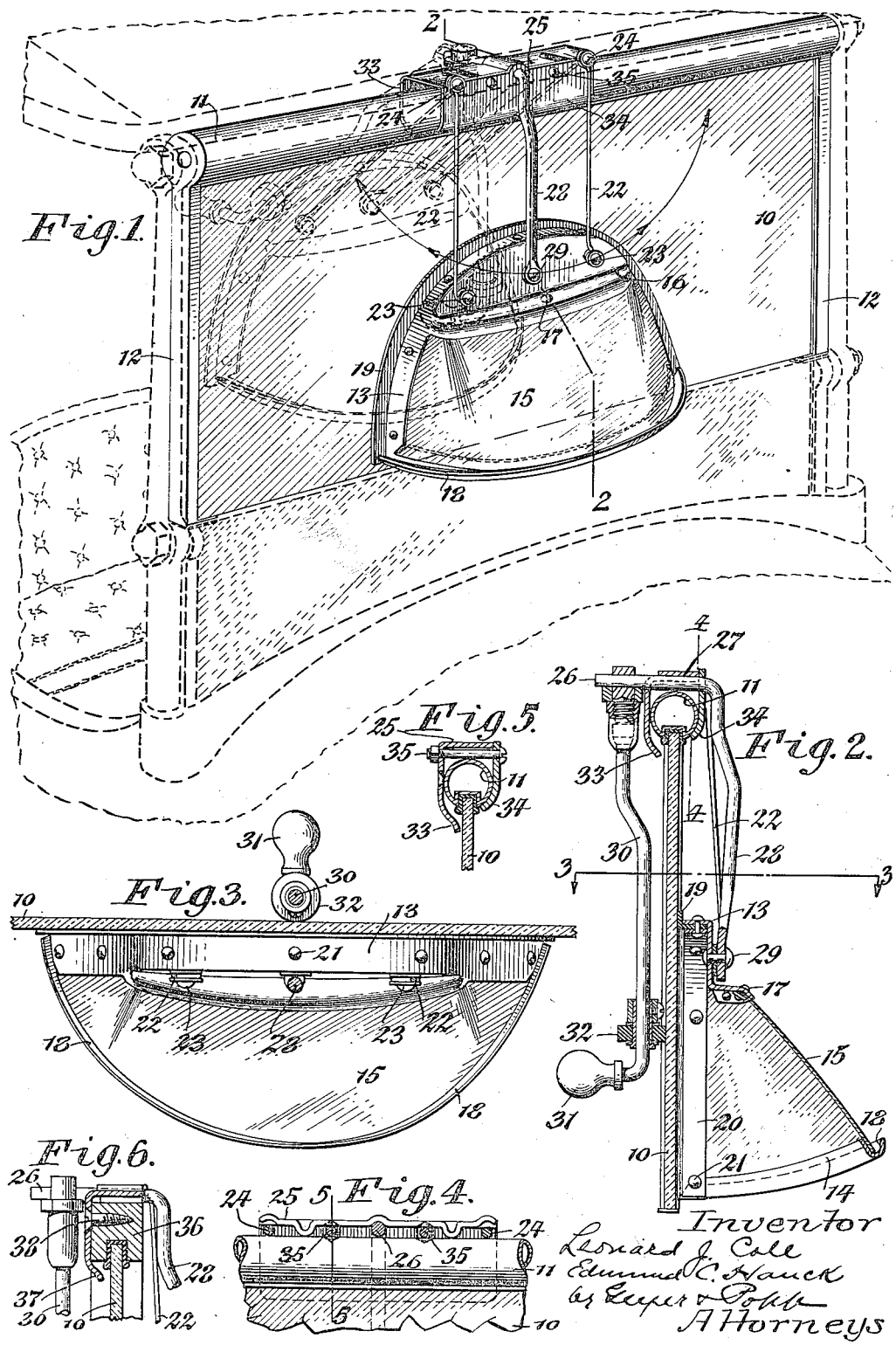

Patented Oct. 30, 1923.

1,472,553

UNITED STATES PATENT OFFICE.

LEONARD J. COLE AND EDMUND C. HAUCK, OF BUFFALO, NEW YORK, ASSIGNORS, BY MESNE AND DIRECT ASSIGNMENTS, TO TRI-ME MANUFACTURING CO. INC., OF BUFFALO, NEW YORK, A CORPORATION OF NEW YORK.

COMBINED CLEANER, RAIN DEFLECTOR, AND LIGHT GUARD FOR WINDSHIELDS.

Application filed February 25, 1922. Serial No. 539,298.

*To all whom it may concern:*

Be it known that we, LEONARD J. COLE and EDMUND C. HAUCK, citizens of the United States, residing in Buffalo, in the county of Erie and State of New York, have invented new and useful Improvements in Combined Cleaners, Rain Deflectors, and Light Guards for Windshields, of which the following is a specification.

This invention relates to a device which in its preferred construction may be utilized as a windshield cleaner, a deflector for keeping the rain and snow away from the front side of the windshield and also as a light guard for preventing the sun light as well as the glare from oncoming head lights from blinding the driver of a motor car, motor boat, locomotive cab, street car, &c.

It is the purpose of this invention to provide a device of this character which is comparatively simple in construction, neat in appearance, easily operable and capable of being readily applied to the windshields of standard construction.

In the accompanying drawings: Figure 1 is a perspective view showing our improved windshield device installed on a windshield. Figure 2 is a vertical section, on an enlarged scale, taken on line 2—2, Fig. 1. Figure 3 is a horizontal section, taken on line 3—3 Fig. 2. Figure 4 is a fragmentary vertical section, taken on line 4—4, Fig. 2. Figure 5 is a vertical section, taken on line 5—5, Fig. 4. Figure 6 is a vertical section similar to Fig. 5 and showing the manner in which the bracket of this windshield device is secured to the wooden frame of the windshield.

Similar characters of reference refer to like parts throughout the several views.

The windshield shown in Figs. 1, 2, 4 and 5 for illustrating one application of our invention consists of an upright pane or plate of glass 10 which is arranged crosswise of the driver's compartment on the automobile in the usual manner and mounted in a frame consisting of an upper horizontal tubular bar 11 which receives the upper edge of the glass pane 10 and two upright side bars 12 which extend downwardly from opposite ends of the horizontal bar 11 and receive the opposite vertical edges of this glass.

In its general organization, this windshield device comprises a hood arranged in front of the windshield glass, a bracket mounted on the windshield and means for operatively connecting the same with this bracket so that the hood can be moved in a vertical plane parallel with the windshield glass for purposes which will be described later on.

The hood preferably has a main frame and a body portion constructed of transparent material which may be moved into and out of the line of vision of the driver. This frame, in its preferred construction, consists of a rear section 13 which is preferably curved and extends from its elevated central part in curved lines downwardly and outwardly toward the lateral sides of the hood, and the lower section 14 which is preferably curved horizontally and extends from the foremost central part of the hood in opposite directions rearwardly toward the lateral sides of the hood and connects with the lower ends of the rear frame section 13.

These two sections of the main frame are preferably constructed of sheet metal by stamping, but if desired they may be otherwise constructed. The body 15 of the hood consists of transparent material, such as celluloid, glass or isinglass and the same in its preferred form is of forwardly bulging or rounded form and secured at its lower edge to the lower frame section on the outer side thereof while its lateral edges are secured to the lateral parts of the rear frame section and the upper edge of the same is secured to a flange 16 projecting forwardly from the upper part of the rear frame section, by means such as a rivet 17, or other suitable means.

Upon placing this hood adjacent to the front of the windshield of an automobile, rain and snow are prevented from lodging on the front side of the windshield which is covered by this hood, inasmuch as the same is deflected from that part of the windshield which is covered thereby, which enables a driver to obtain a clear vision of the road ahead through this portion of the protecting windshield. The transparent body of the hood also operates as a light shade so that the sun light does not affect the eyes of the operator.

The transparent body of the windshield is also provided with a suitable color, such as red or green, so that a driver of the automobile can look forwardly through the same without being blinded by the glaring effect of the head lights of other oncoming cars.

In order to prevent the rain which is deflected by the hood, from running downwardly on the front portion of the hood, where the same would be liable to interfere with the clear vision of the driver, a gutter 18 is provided which is preferably formed on the lower frame section and which extends from the central front part of this frame section in opposite directions of the hood and downwardly toward the opposite lateral sides thereof so that this gutter terminates adjacent to the front side of the windshield, whereby any rain water which is received by this gutter from the hood will be carried rearwardly and discharged on opposite sides of the hood, leaving the space immediately below the hood unobstructed by a spray of rain water and thus enable the driver to see the road more distinctly and thus insuring greater safety in driving.

This hood is so mounted on the windshield that the same can be moved vertically and in a plane parallel with the front side of the windshield glass so that the driver can place the hood either in front of the line of vision for protecting the eyes of the driver, also providing a clear space on the windshield during rainy weather, or the hood can be shifted to one side of the line of vision when the hood is not required for use. This movement of the hood is utilized for operating a cleaner which is designed to wipe off any rain or snow which may gather on the front side of the windshield glass, if any has been deposited thereon, within the vision area. For this purpose a cleaning or wiping strip 19 of rubber or similar material is mounted on the rear frame section, so as to engage the front side of the windshield glass, this cleaning strip being preferably of crescent or curved form corresponding to the rear frame section and secured with its front portion between the inner side of the rear frame section and a clamping strip 20 of metal, these several parts being connected with each other by means of rivets 21, as shown in Figs. 1, 2 and 3, or by any other suitable means. It follows from this construction, that a movement of this hood parallel with the front side of the windshield whereby the cleaning strip or wiper is in engagement therewith, will remove any snow or rain water which may have been deposited thereon and thus keep the vision area of the windshield clearly transparent so that the driver will always have a good view of the road ahead.

This hood may be moved parallel with the windshield glass by any suitable means but preferably by means which are constructed to impart a vertically swinging movement. In the construction shown in Figs. 1, 2, 3 and 4, for accomplishing this purpose, two links 22 are employed which are arranged in front of the upper part of the windshield glass and pivotally connected at their lower ends by means of rivets 23 with the upper part of the rear frame section on the front side thereof, while the upper ends of these links are connected by means of rivets or pivot pins 24 with the horizontal web 25 of a supporting bracket mounted on the upper side of the windshield bar 11. These links are of the same length and the upper pivot pins 24 are in line horizontally and the lower pivot pins 23 are also in line horizontally so that upon swinging the hood crosswise of the automobile in front of the different parts of the windshield, the same will also be maintained in an upright position by reason of the parallelogram movement afforded by these links. In Fig. 1 the hood is represented by full lines in its lowermost position and by dotted lines the same is represented moved toward one side and elevated relative to its lowermost position, it being optional for the driver to shift the hood into whatever position he desires, to suit the prevailing light or weather conditions. This rocking motion is imparted to the hood by the driver while occupying a position in rear of the windshield and is preferably effected by means of an operating lever which in its preferred form comprises a horizontal wrist or shaft 26 journaled horizontally in a suitable bearing 27 formed in the central part of the bracket web 25, between the upper and lower pivot pins 24, a front shifting arm 28 projecting downwardly from the front end of the wrist or shaft 26 and pivotally connected at its lower end by means of a rivet 29 with the upper part of the rear hood frame section, and a rear operating arm 30 arranged in rear of the windshield glass 10 having its upper end connected with the rear end of the wrist or shaft 26 while its lower end is provided with a handle 31. On its lower part this operating arm 30 is provided with a bearing member 33, such as a roller of rubber which engages with the rear side of the windshield glass 10 and operates to hold the hood close to the front side of the windshield glass and the wiping or cleaning strip 19 in firm engagement therewith. By grasping the handle 31, the driver can operate the hood and move the same back and forth on the front side of the windshield glass for the purpose of cleaning the same or bringing the hood into whatever position he desires to suit the weather conditions.

The web or plate 25 of the supporting bracket may be secured to the windshield frame in any suitable manner. When the upper bar of the windshield frame is constructed of a metal tube, as shown at 11, in Figs. 1, 2, 4 and 5, this web or plate is preferably secured to this bar by means of a rear flange or jaw 33 and permanently connected with the rear edge of the plate 25 engaging with the rear side of the bar 11, and a front flange or jaw detachably connected with the front edge of the plate 25 and engaging with the front side of the bar 11. The rear jaw 33 is preferably formed integrally with the plate 25 and the front jaw 24 is preferably detachably connected therewith by means of screws or bolts 35, as best shown in Fig. 5.

If desired, the upper horizontal bar 36 of the windshield glass may be made of wood as shown in Fig. 6, the front jaw 34 of the attaching or supporting bracket may be omitted and instead a rear jaw 37 thereof may be secured to the rear side of the windshield bar 36 by means of one or more screws 38. By this means this windshield device may be readily secured to either a metal or a wooden windshield frame without involving any changes in construction.

As a whole, this windshield device is comparatively simple in construction and can be produced at low cost. It can be readily applied to the standard forms of windshields now in general use and it operates most efficiently to keep the vision area of the windshield glass free from rain and snow so that an unobstructed view may be had of the road ahead and it also operates effectively to protect the eyes of the driver from the blinding glare of the sun light or the headlights of oncoming automobiles.

We claim as our invention:

1. A device of the character described comprising a hood adapted to be arranged in front of a wind shield, and a pair of vertically swinging links pivotally connected at their lower ends with said hood and adapted to be pivotally supported at their upper ends.

2. A device of the character described comprising a hood adapted to be arranged in front of a wind shield, a pair of vertically swinging links pivotally connected at their lower ends with said hood, and a bracket which is adapted to be mounted on the wind shield and on which the upper ends of said links are pivotally mounted.

3. A device of the character described comprising a hood adapted to be arranged in front of a wind shield, a pair of vertically swinging links pivotally connected at their lower ends with said hood, a bracket which is adapted to be mounted on the wind shield and on which the upper ends of said links are pivotally mounted, and an operating lever having a horizontal wrist journaled on said bracket, a front shifting arm projecting downwardly from the front end of said wrist and pivotally connected at its lower end with said hood and a rear operating arm connected with the rear end of said wrist.

4. A device of the character described comprising a hood adapted to be arranged in front of a wind shield, a pair of vertically swinging links pivotally connected at their lower ends with said hood, a bracket which is adapted to be mounted on the wind shield and on which the upper ends of said links are pivotally mounted, and an operating lever having a horizontal wrist journaled on said bracket, a front shifting arm projecting downwardly from the front end of said wrist and pivotally connected at its lower end with said hood and a rear operating arm connected with the rear end of said wrist and projecting downwardly therefrom and provided on its lower end with a bearing member adapted to engage with the rear side of the wind shield.

LEONARD J. COLE.
EDMUND C. HAUCK.